United States Patent
Nise et al.

(10) Patent No.: US 12,522,138 B2
(45) Date of Patent: Jan. 13, 2026

(54) VEHICULAR EXTERIOR MIRROR ASSEMBLY WITH DUAL/NESTED COIL SPRING AT PIVOT JOINT

(71) Applicant: Magna Mirrors of America, Inc., Holland, MI (US)

(72) Inventors: Johnathan D. Nise, Kentwood, MI (US); Adam S. McCain, Petoskey, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 378 days.

(21) Appl. No.: 18/295,308

(22) Filed: Apr. 4, 2023

(65) Prior Publication Data

US 2023/0311764 A1    Oct. 5, 2023

Related U.S. Application Data

(60) Provisional application No. 63/362,467, filed on Apr. 5, 2022.

(51) Int. Cl.
*B60R 1/074* (2006.01)

(52) U.S. Cl.
CPC .................... *B60R 1/074* (2013.01)

(58) Field of Classification Search
CPC .......... B60R 1/074; B60R 1/076; B60R 1/062
USPC ................................. 359/877, 841
See application file for complete search history.

(56) References Cited

U.S. PATENT DOCUMENTS

| | | | | |
|---|---|---|---|---|
| 4,626,085 A * | 12/1986 | Suzuki | ................ | B60R 1/074 359/841 |
| 4,726,656 A * | 2/1988 | Schofield | ............. | B60R 1/089 359/603 |
| 4,832,477 A * | 5/1989 | Torii | ..................... | B60R 1/074 248/478 |
| 4,982,926 A * | 1/1991 | Mori | ..................... | B60R 1/074 248/479 |
| 5,166,832 A * | 11/1992 | Zychowicz | ........... | B60R 1/074 248/479 |
| 5,369,530 A * | 11/1994 | Yamauchi | ............ | B60R 1/0617 359/872 |
| 5,703,731 A | 12/1997 | Boddy et al. | | |
| 5,828,504 A * | 10/1998 | Beuzeville | ............ | B60R 1/074 359/872 |
| 6,322,221 B1 | 11/2001 | van de Loo | | |
| 6,637,715 B2 | 10/2003 | Hoek | | |
| 7,070,287 B2 * | 7/2006 | Foote | ..................... | B60R 1/074 359/841 |

(Continued)

*Primary Examiner* — Ricky D Shafer
(74) *Attorney, Agent, or Firm* — HONIGMAN LLP

(57) ABSTRACT

A vehicular exterior rearview mirror assembly includes a mirror head that includes a mirror reflective element and a mounting base configured for attachment at a side of a vehicle. The mirror head is movable relative to the mounting base between an extended position and a folded position. A pivot assembly includes (i) a pivot post fixed relative to the mounting base, (ii) a housing portion pivotable about the pivot post, and (iii) a biasing element disposed at the pivot post between the housing portion and an end of the pivot post, the biasing element urging a detent interface into engagement. The detent interface moves into engagement to secure the mirror head in the extended or folded position. The biasing element includes first and second coil portions having overlapping and alternating coil patterns.

14 Claims, 6 Drawing Sheets

(56) References Cited

U.S. PATENT DOCUMENTS

| | | |
|---|---|---|
| 7,073,914 B2 | 7/2006 | Pavao |
| 7,165,852 B2 | 1/2007 | Pavao et al. |
| 7,267,449 B1 | 9/2007 | Boddy et al. |
| 7,887,202 B1 | 2/2011 | Peterson |
| 8,129,642 B2 | 3/2012 | Brouwer et al. |
| 8,201,305 B2 | 6/2012 | Brouwer et al. |
| 8,313,202 B2 | 11/2012 | van Stiphout et al. |
| 9,067,541 B2 | 6/2015 | Sobecki et al. |
| 9,487,142 B2 | 11/2016 | Sobecki et al. |
| 9,987,987 B2 | 6/2018 | van Stiphout et al. |
| 10,562,453 B2 | 2/2020 | van Stiphout |
| 10,940,801 B1 | 3/2021 | Harris et al. |
| 11,173,843 B2 | 11/2021 | Peterson et al. |
| 11,214,198 B2 | 1/2022 | Harris et al. |
| 11,351,919 B2 | 6/2022 | Esser |
| 11,396,264 B2 | 7/2022 | Peterson et al. |
| 2022/0073001 A1 | 3/2022 | Peterson et al. |
| 2022/0126751 A1 | 4/2022 | Steffes et al. |
| 2022/0258672 A1* | 8/2022 | Peterson ................. B60R 11/04 |
| 2023/0009664 A1 | 1/2023 | Esser et al. |
| 2024/0181965 A1 | 6/2024 | Wesley et al. |

* cited by examiner

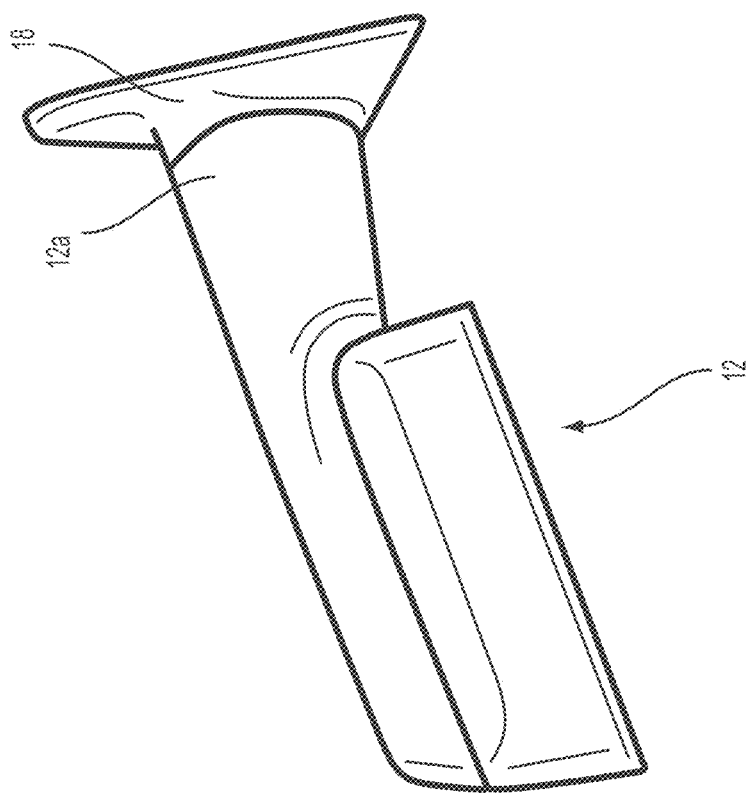
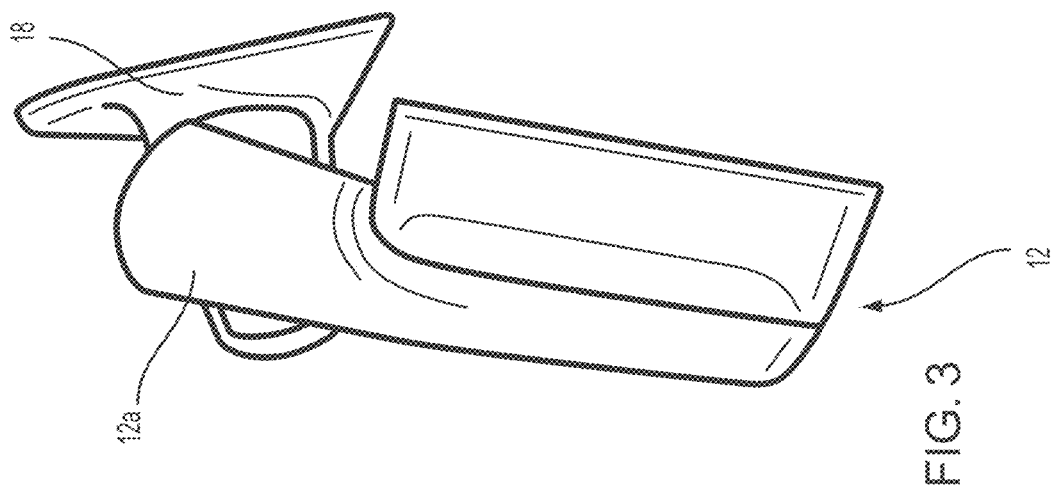

VEHICULAR EXTERIOR MIRROR ASSEMBLY WITH DUAL/NESTED COIL SPRING AT PIVOT JOINT

CROSS REFERENCE TO RELATED APPLICATION

The present application claims the filing benefits of U.S. provisional application Ser. No. 63/362,467, filed Apr. 5, 2022, which is hereby incorporated herein by reference in its entirety.

FIELD OF THE INVENTION

The present invention relates generally to exterior rearview mirror assemblies for vehicles and, more particularly, to powerfold or breakaway exterior rearview mirror assemblies.

BACKGROUND OF THE INVENTION

It is known to provide an automotive exterior rearview mirror assembly that includes a foldable mirror assembly, such as a powerfold mirror where the mirror head is pivotable via an actuator between a drive or use position and a folded or park position.

SUMMARY OF THE INVENTION

A vehicular exterior rearview mirror assembly (such as an exterior rearview mirror assembly mounted at a side of an equipped vehicle) includes a mirror head including a mirror casing and a mirror reflective element. The mirror head is pivotally mounted at a mounting arm or mounting portion disposed at a side of a vehicle equipped with the rearview mirror assembly. The mirror head is pivotable relative to the mounting arm at least between a drive or use or extended position, where the mirror head is extended from the side of the vehicle so that the mirror reflective element provides a view to the driver of the vehicle that is rearward and along the respective side of the vehicle, and a folded or park position, where the mirror head is pivoted in toward the side of the vehicle so that the mirror reflective element faces the side of the vehicle. The rearview mirror assembly includes a pivot assembly that is configured to enable the mirror head to pivot between the folded and the drive position and that includes detents or a detent interface to retain the mirror head in the folded or drive position. The pivot assembly includes a dual/nested spring that biases the pivot assembly into the detent position so that, when the mirror head is pivoted to the folded or drive position, the detent interface of the pivot assembly engages to retain the mirror head in the folded or drive position. The dual/nested spring may include a nested design where a first coil portion and a second coil portion have alternating and overlapping coil patterns. Optionally, the pivot assembly may form a portion of a powerfold actuator that includes an electrically operable motor that, when operated, pivots the mirror head between the folded and drive positions. Optionally, the pivot assembly may be part of a breakaway or manually folding mirror assembly, which allows for pivotal movement between the use and folded positions via manual force applied at the mirror head.

These and other objects, advantages, purposes and features of the present invention will become apparent upon review of the following specification in conjunction with the drawings.

BRIEF DESCRIPTION OF THE DRAWINGS

FIG. 2 is a top plan view of the exterior rearview mirror assembly, with the mirror head pivoted to a drive or use position;

FIG. 3 is a top plan view of the exterior rearview mirror assembly, with the mirror head pivoted to a folded or non-use position;

DESCRIPTION OF THE PREFERRED EMBODIMENTS

Figure 1:
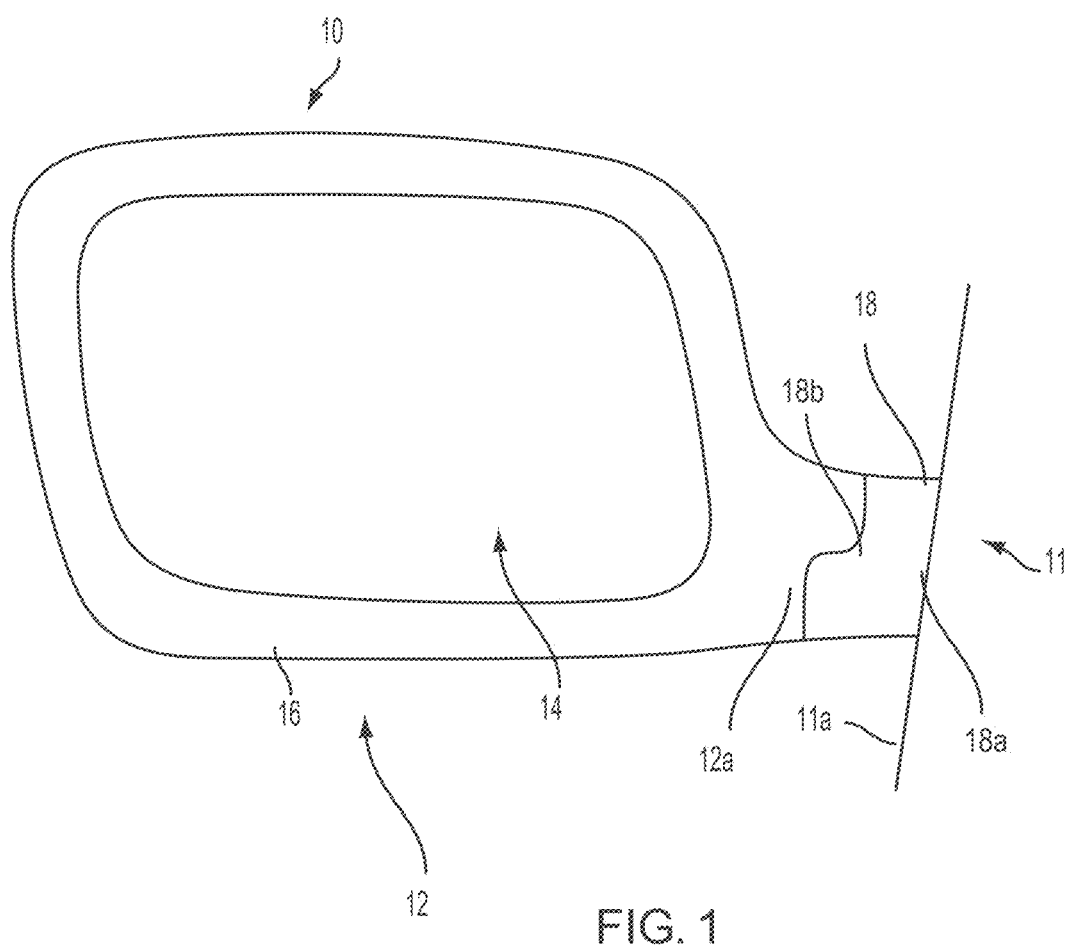
FIG. 1 is a view of an exterior rearview mirror assembly disposed at the side of a vehicle.

Referring now to the drawings and the illustrative embodiments depicted therein, an exterior rearview mirror assembly 10 for a vehicle 11 includes a mirror head 12 that includes a mirror reflective element 14 received in and/or supported at or by a mirror shell or casing 16 of the mirror head portion 12 (FIG. 1). The mirror head portion 12 includes a mounting portion 12a that is pivotally or movably mounted to a mounting arm or base portion 18. The mirror assembly 10 may comprise a powerfold mirror (where the mirror head portion may be pivoted via an actuator assembly or adjustment device), and/or the mirror assembly may comprise a breakaway mirror (where the mirror head portion may be manually pivoted about the mounting arm or base). The mounting arm or base 18 of the mirror assembly 10 is mounted at the side 11a of a host or subject vehicle 11, with the reflective element 14 providing a rearward field of view along the respective side of the vehicle to the driver of the vehicle, as discussed below. The mounting arm 18 has a first end 18a configured for attachment at the side 11a of the vehicle 11 and a second end 18b distal from the first end 18a. The mirror head 12 is pivotally mounted at the second end 18b of the mounting arm 18 via the mounting portion 12a of the mirror head 12. The mirror head 12 includes the mirror casing 16 and the mirror reflective element 14.

As discussed below, the mirror assembly 10 includes a pivot assembly 20 (FIG. 7) that mounts or attaches to the mounting arm 18 at the vehicle 11 and that attaches to the mirror head 12 to allow the mirror head to pivot relative to the mounting arm 18 and about a pivot axis defined by the pivot assembly 20. The pivot assembly 20 allows the mirror head 12 to pivot between a plurality of detent positions, including a use or drive position (FIG. 2), where the mirror head 12 is extended relative to the side of the vehicle and the mounting arm 18 to provide the view to the driver of the vehicle rearward and along the respective side of the vehicle, and a folded or park position (FIG. 3), where the mirror head 12 is folded or pivoted in from the extended position relative to the mounting arm 18 to be disposed along the side of the vehicle. Optionally, the mirror head may also be manually pivoted to a fully forward position, where the mirror head 12 is pivoted or rotated beyond the drive position, such as in response to impact of the mirror head 12 with an object. A seal may be disposed along the interface between the mounting portion 12a of the mirror head 12 and the mounting arm or base 18.

The mirror assembly 10 may include a powerfold mirror assembly where the pivot assembly 20 includes a powerfold actuator that is operable to pivot the mirror head 12 (including the mirror casing 16 and reflective element 14) relative to the mounting arm or base 18. The powerfold actuator includes an electrically operable motor and, when the powerfold actuator is operated, the electric motor is electrically operated to pivot the mirror head 12 relative to the mounting arm 18 between at least the folded position and the drive position. The mirror head 12 is also pivotable manually to either the folded position or the drive position. Optionally, the mirror assembly does not include a powerfold actuator and the mirror head may only be pivotable relative to the mounting arm via manual rotation of the mirror head.

When the mirror head 12 is pivoted between the drive position and the folded position, the mirror head 12 pivots about the pivot axis of the pivot assembly and the mirror head 12 may lift along the pivot axis relative to the mounting arm 18 and the seal disposed along the interface between the mirror head 12 and the mounting arm 18 to relieve stress at the seal and to reduce the force necessary to pivot the mirror head 12 (such as the force applied by the motor of the powerfold actuator to pivot the mirror head 12). For example, one or more detent interfaces of the pivot assembly 20 may cause the mirror head 12 to lift relative to the mounting arm 18 when the mirror head 12 is pivoted relative to the mounting arm 18. When the mirror head 12 arrives at or is pivoted to the drive position or the folded position, the detent interfaces of the pivot assembly 20 may engage and a retaining force may be applied to the detent interfaces to secure the mirror head 12 in the drive or folded position. Thus, as the housing and mirror head are rotated toward the folded or park position via operation of the electrically operated motor, the housing lifts in relation to the base while turning, and such lifting lifts the mirror head and increases the gap between the mirror head mounting portion 12a and the mounting arm 18 and thus reduces or limits or avoids pressure at the cut line seal (the seal that is disposed between and at the interface of the mirror head mounting portion 12a and the mounting arm 18 and that follows the contour and fills the gap between the mirror head and the base) during pivotal movement of the mirror head.

As discussed further below, the pivot assembly 20 includes a biasing member or spring element to bias the pivot assembly toward the detent engaged position and/or toward the lifted position when the mirror head is pivoted. For example, when the biasing member urges the detent interfaces into engagement, stability of the mirror head 12 at the drive and folded positions may be improved. When the biasing member urges the mirror head from a detent position (e.g., the extended position) toward a lifted position during pivoting of the mirror head, less force may be required to pivot the mirror head between the drive and folded positions and the mirror head may pivot more quickly between positions.

Figure 4:
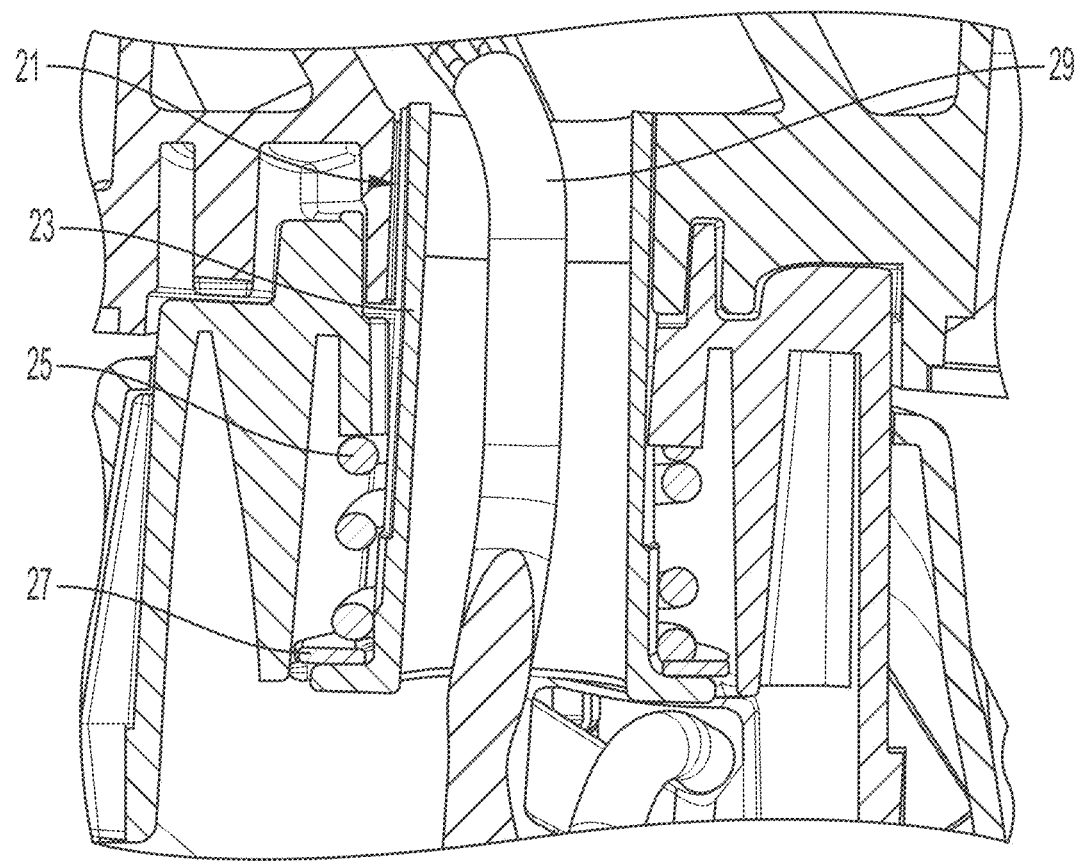
FIG. 4 is a cross-sectional view of a traditional pivot assembly that pivotally attaches a mirror head to a mounting arm at the side of a vehicle, where the traditional pivot assembly includes a traditional coil spring.
Figure 5:
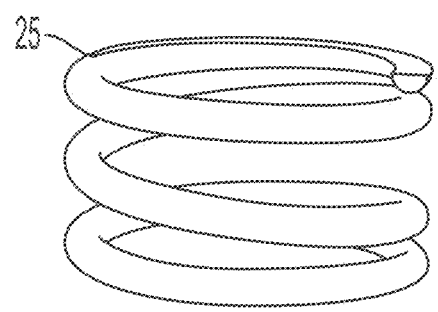
FIG. 5 is a perspective view of the traditional coil spring.

As shown in FIGS. 4 and 5, a traditional mirror system may join the mirror head to the mounting arm with two mating parts (e.g., a base and the mounting arm/bracket) joined to a pivot assembly or mechanism 21 that includes a pivot tube 23, a traditional coil spring 25, and a washer 27. The configuration allows for rigid attachment between parts and allows a wire harness 29 to pass through the pivot tube 23. The spring forces of the coil spring 25 may vary depending on the mirror assembly, such as between 200 and 1600 Newtons. However, the traditional coil spring 25, such as due to the natural frequency of the single spring, may provide inconsistent forces for the pivot assembly 21 and the biasing force of the traditional coil spring may be limited by packaging and size constraints of the pivot assembly 21.

Figure 6:
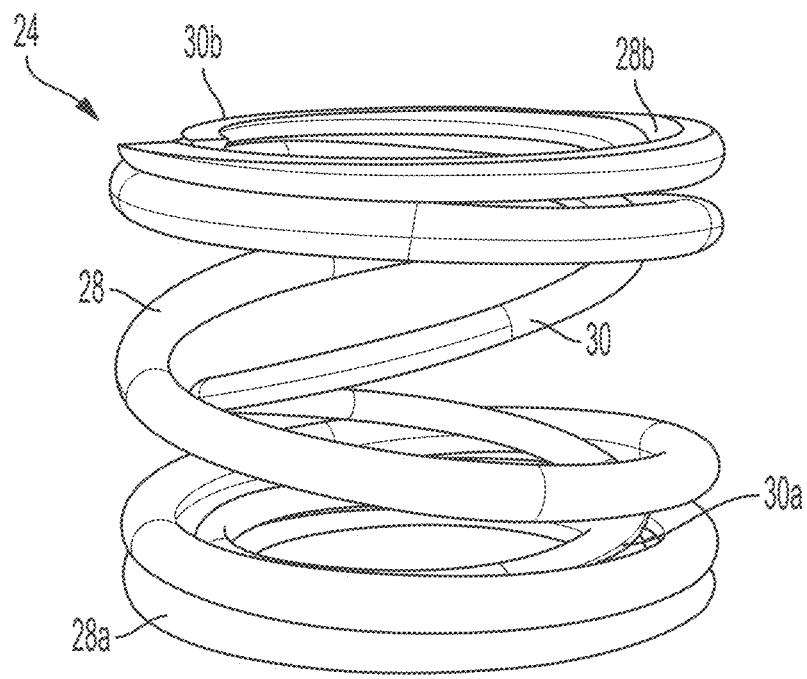
FIG. 6 is a perspective view of a dual/nested coil spring.
Figure 7:
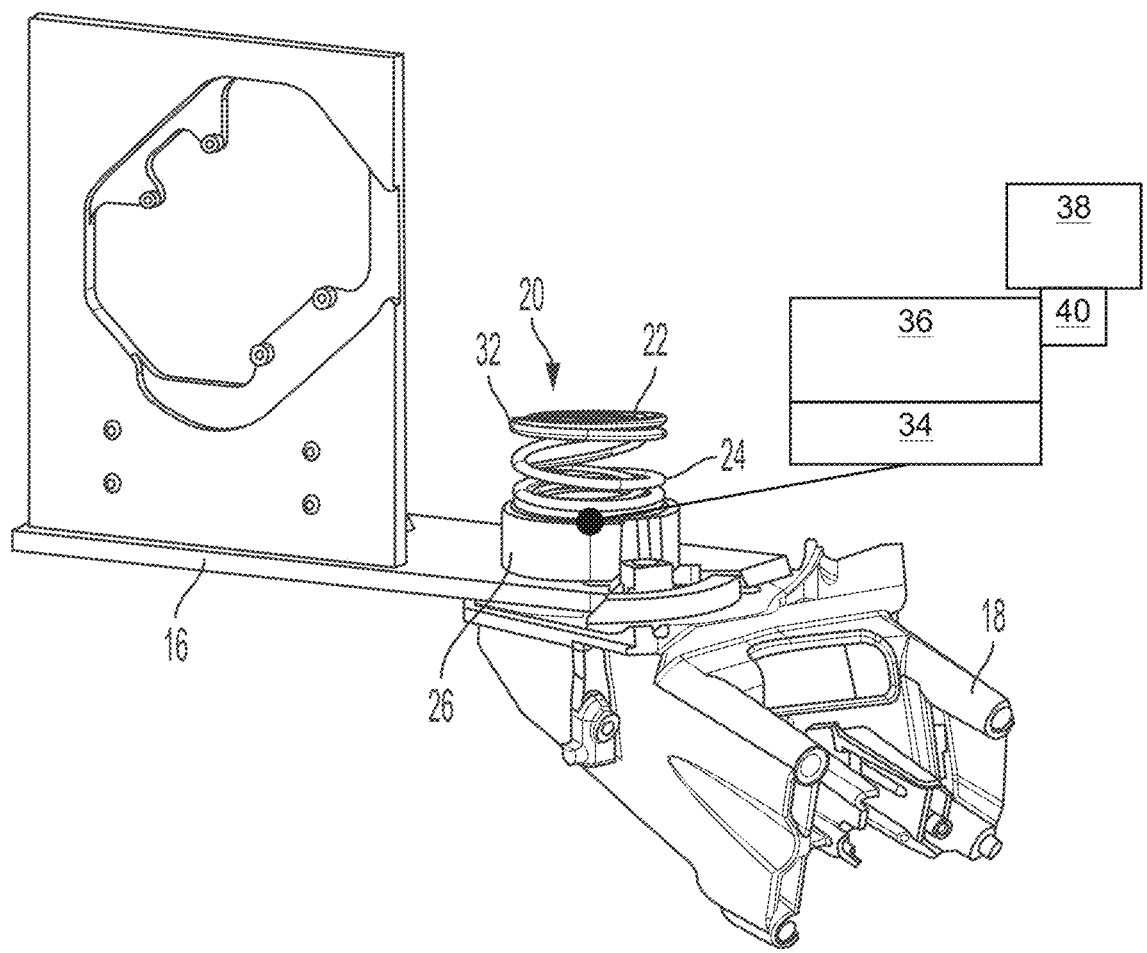
FIGS. 7 and 8 are perspective views of a pivot assembly pivotally attaching a mirror head at a mounting arm at the side of a vehicle, where the pivot assembly includes the dual/nested coil spring of FIG. 6.
Figure 8:
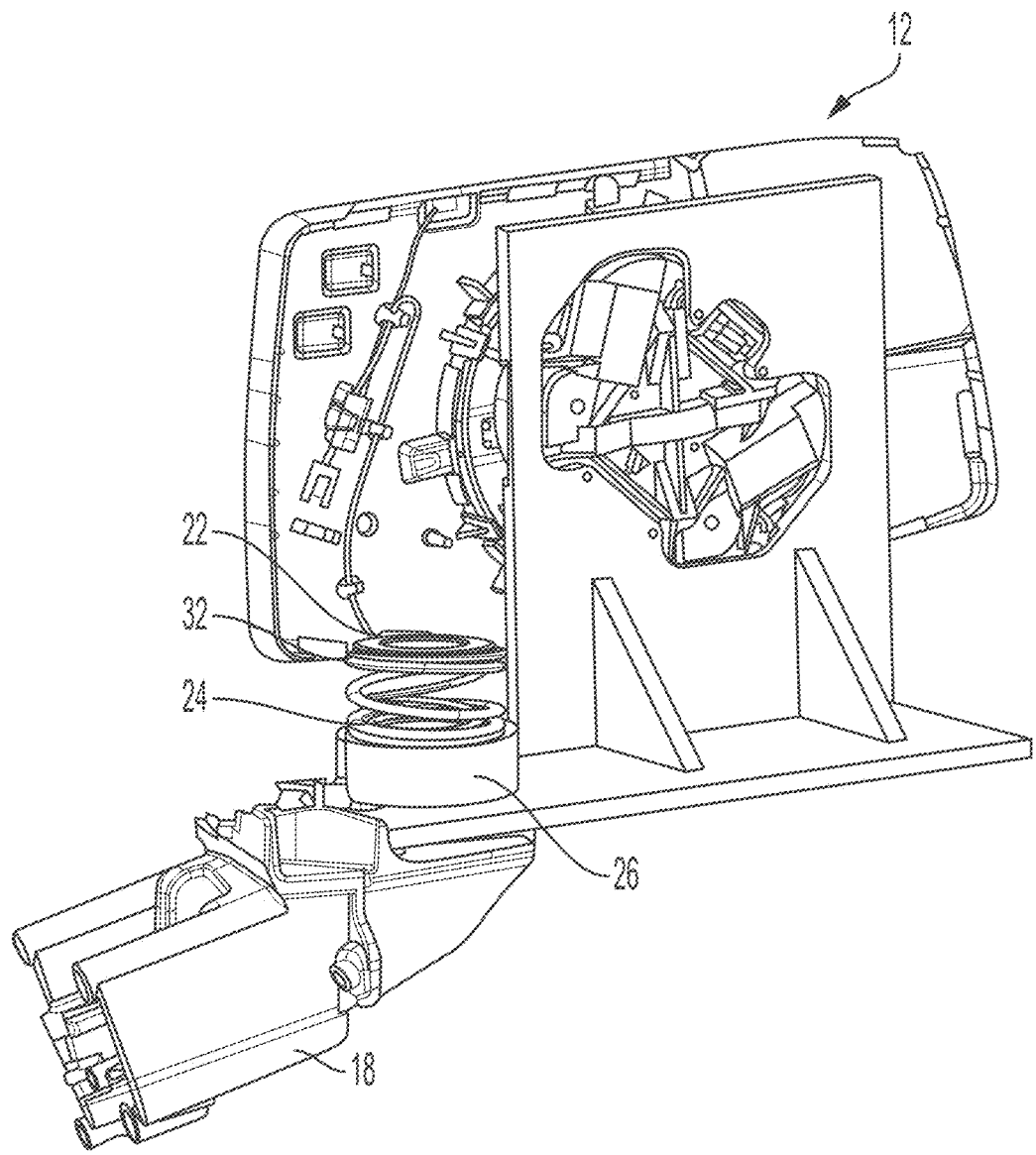

As shown in FIGS. 6-8, the pivot assembly 20 of the vehicular exterior rearview mirror assembly 10 includes a pivot tube 22, a biasing member or spring element 24, and a housing member 26. The pivot assembly 20 defines the pivot axis of the mirror head 12 relative to the mounting arm 18, such as along a longitudinal axis of the pivot tube 22, and the mirror head 12 may lift relative to the mounting arm 18 along the pivot tube 22. The biasing member 24 is a dual or nested spring having a first coil 28 and a second coil 30 where the first coil 28 and the second coil 30 have alternating and overlapping coil patterns along the length of the spring 24 to provide greater and more consistent biasing forces in a package that may be similar in size to a traditional coil spring.

For example, the first coil 28 may have a lower planar or base or terminal coil 28a at a first end of the first coil 28 and an upper planar or base or terminal coil 28b at a second end of the first coil 28 opposite the first end where the rings or loops of the coil 28 extend in a first direction from the lower coil 28a to the upper coil 28b (e.g., clockwise in FIG. 6). The second coil 30 may have a lower planar or base or terminal coil 30a at a first end of the second coil 30 and an upper planar or base or terminal coil 30b at a second end of the second coil 30 opposite the first end where the rings or loops of the coil 30 extend in an opposite second direction from the lower coil 30a to the upper coil 30b (e.g., counterclockwise in FIG. 6). The respective lower ends 28a, 30a and upper ends 28b, 30b of the first and second coils 28, 30 may form planar upper and lower surfaces of the biasing member 24 for engaging elements of the pivot assembly 20. In other words, the first coil 28 and the second coil 30 may terminate at overlapping or corresponding or coplanar positions.

Thus, when the dual spring 24 is compressed, such as between an upper end of the pivot tube 22 and a surface of the housing member 26 of the powerfold actuator, the first coil 28 and the second coil 30 may compress an equal distance or amount. Further, the first coil 28 and the second coil 30 provide respective biasing forces, such as between the upper end of the pivot tube 22 and the surface of the housing member 26, together and in tandem. That is, because both the first coil 28 and the second coil 30 are engaged at their respective first ends 28a, 30a and at their respective second ends 28b, 30b, the first coil 28 and the second coil 30 each provide a respective biasing force. The first coil 28 may provide a first biasing force and the second coil 30 may provide a second biasing force that is equal to or different from the first biasing force. The first biasing force of the first coil 28 and the second biasing force of the second coil 30 may cooperate to provide a substantially consistent or uniform biasing force throughout a range of compression of the dual spring 24.

The frequency of the first coil 28 may offset the frequency of the second coil 30 and the dual spring 24 may be used in the same placement and application as a traditional coil spring (i.e., in a powerfold mirror actuator or a manual fold pivot assembly). That is, use of a dual/nested spring offsets the natural frequency of a single spring. The dual spring may be used in the same application as the current single spring. The dual spring may provide improved mirror performance. For example, a pivot assembly having the dual spring may retain the mirror head in the detent positions (i.e., drive and folded positions) more securely than a pivot assembly having a traditional coil spring.

The dual spring allows for more force in a smaller package without overstressing the spring. In other words, when compared to a single spring having a similar spring gauge and height or length as one or more of the coils of the dual spring, the dual spring provides greater biasing force at the pivot assembly. Because larger mirror heads may require greater retaining force to hold the mirror head in the folded or drive position, the greater force provided by the dual spring allows for smaller profile actuators to be used with larger mirror heads. For example, the dual spring 24 may allow for a shorter pivot tube of the powerfold actuator as a greater force can be applied over a shorter distance than a traditional biasing element.

In the illustrated embodiment, the pivot post 22 is fixed relative to the mounting arm 18 and the dual spring element 24 is disposed between an upper end of the pivot post 22 and the housing portion 26 of the pivot assembly to urge the housing portion 26 into engagement with the mirror casing 16 of the mirror head 12. The housing portion 26 may be keyed into engagement with the mirror casing 16 and/or a pivotable member of the mirror head 12 attached at the mounting arm 18. The spring element 24 may engage a washer or resilient member 32 at the upper end of the pivot post 22.

The pivot assembly 20 may have at least one detent interface 34 that guides lifting of the mirror head 12 relative to the mounting arm 18 when the mirror head 12 is pivoted between the folded and drive positions. For example, a base portion may be disposed at and fixed relative to a bottom or lower end of the pivot post 22 and respective detent surfaces of the housing portion 26 and the base portion may form a detent interface 34 where, as the housing portion 26 and mirror head 12 pivot relative to the mounting arm 18 and base portion, respective detents of the detent surfaces engage one another to force the mirror head vertically along the pivot post 22 and against the biasing force of the spring element 24. When the detent surfaces are aligned, the spring element 24 urges the detents together to secure the mirror head in the drive or folded position.

As discussed above, the pivot assembly 20 may comprise a portion of a powerfold actuator. Thus, the pivot assembly 20 may include an output gear 36 disposed along and circumscribing the pivot post 22. The electrically operable motor 38 when operated, such as responsive to a user input, rotatably drives a gear 40 that engages the output gear 36 to pivot the mirror head relative to the output gear 36 and the pivot post 22. The spring element 24 may be disposed between the upper end of the pivot post 22 and an upper surface of the output gear 36 to bias the output gear 36 towards the mounting arm. Optionally, the spring element 24 may be disposed between the housing portion 26 and a lower surface of the output gear 36 to bias the output gear 36 towards the upper end of the pivot post 22. The powerfold actuator may comprise one or more detent elements to guide lifting of the pivot assembly 20 along the pivot post 22 and to guide the spring load of the spring element 24 to bias the elements of the pivot assembly into engagement. The actuator and mirror assembly may utilize aspects of the actuators and mirror assemblies described in U.S. Pat. Nos. 11,396,264; 11,173,843; 9,487,142; 9,067,541 and/or 7,887,202, and/or U.S. Publication Nos. US-2023-0009664; US-2022-0126751 and/or US-2022-0073001, and/or International Publication No. WO 2022/226525, which are all hereby incorporated herein by reference in their entireties.

The mirror assembly may also be manually pivotable between at least the folded position and the drive position and may comprise a break-away mirror assembly where the mirror head is configured to fold when a force is applied to the mirror head, such as when an obstacle strikes the mirror assembly. The mirror assembly may utilize aspects of the mirror assemblies described in U.S. Pat. Nos. 6,637,715 and/or 7,165,852, which are hereby incorporated herein by reference in their entireties.

The mirror assembly may comprise any suitable construction, such as, for example, a mirror assembly with the reflective element being nested in the mirror casing and with the mirror casing having a curved or rounded perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, which are hereby incorporated herein by reference in their entireties), or such as a mirror assembly having a rear substrate of an electro-optic or electrochromic reflective element nested in the mirror casing, and with the front substrate having curved or rounded perimeter edges, or such as a mirror assembly having a single glass substrate reflective element that is disposed at an outer perimeter edge of the mirror casing and with the glass substrate having curved or rounded perimeter edges, or such as a mirror assembly having a reflective element glass substrate that is circumscribed by a perimeter wall of an attachment plate, with no part of the perimeter wall of the attachment plate encroaching or overlapping onto the outermost surface of the glass substrate, such as by utilizing aspects of the mirror assemblies described in U.S. Pat. Nos. 10,099,618; 9,827,913; 9,598,016; 9,346,403; 9,174,578; 8,915,601; 8,730,553 and/or 8,508,831, which are hereby incorporated herein by reference in their entireties. In such applications, the mirror reflective element may be adhesively attached at a bracket or attachment plate of the mirror head and may move together and in tandem with the mirror head relative to the mounting arm. The mirror assembly may include an actuator at the mounting arm or mirror head that operates to pivot or adjust the mirror head (and reflective element) relative to the mounting arm and the side of the vehicle at which the mounting arm is attached.

Changes and modifications in the specifically described embodiments may be carried out without departing from the principles of the present invention, which is intended to be limited only by the scope of the appended claims as interpreted according to the principles of patent law.

The invention claimed is:

1. A vehicular exterior rearview mirror assembly, the vehicular exterior rearview mirror assembly comprising:

a mirror head comprising a mirror reflective element;

a mounting base configured for attachment at a side of a vehicle;

wherein the mirror head is movable relative to the mounting base between at least an extended position, where the mirror head is extended outward from the side of the vehicle so that the mirror reflective element is positioned to provide a rearward field of view at the side of the vehicle to a driver of the vehicle, and a folded position, where the mirror head is moved inward from the extended position toward the side of the vehicle;

a pivot assembly comprising (i) a pivot post fixed relative to the mounting base, (ii) a housing portion pivotable about the pivot post and (iii) a biasing element disposed at the pivot post between the housing portion and an end of the pivot post, the biasing element exerting an axial biasing force to urge a detent interface of the pivot assembly into engagement;

wherein, when the mirror head is moved to the extended position or the folded position, the detent interface of the pivot assembly moves into engagement to secure the mirror head in the extended position or in the folded position;

wherein the biasing element comprises a first coil portion and a second coil portion, and wherein the second coil portion is disposed radially inboard of the first coil portion, and wherein the first coil portion is coiled in an opposite direction than the second coil portion; and wherein the first coil portion provides a first axial biasing force at the pivot assembly and the second coil portion provides a second axial biasing force at the pivot assembly.

2. The vehicular exterior rearview mirror assembly of claim 1, wherein the pivot assembly comprises a portion of a powerfold actuator that includes an electrically operable motor that, when electrically operated, pivots the mirror head between at least the extended position and the folded position.

3. The vehicular exterior rearview mirror assembly of claim 2, wherein the pivot assembly comprises an output gear disposed along and circumscribing the pivot post, and wherein the electrically operable motor rotatably drives a gear that engages the output gear to pivot the mirror head relative to the output gear and the pivot post.

4. The vehicular exterior rearview mirror assembly of claim 3, wherein the biasing element is disposed between the end of the pivot post and the output gear to bias the output gear toward the mounting base.

5. The vehicular exterior rearview mirror assembly of claim 1, wherein the mirror head is manually pivotable relative to the mounting base between the extended position and the folded position.

6. The vehicular exterior rearview mirror assembly of claim 1, wherein the mirror head is manually pivotable relative to the mounting base beyond the extended position to a forward fold position.

7. The vehicular exterior rearview mirror assembly of claim 1, wherein the axial biasing force is greater than 1600 Newtons.

8. The vehicular exterior rearview mirror assembly of claim 1, wherein the first coil portion and the second coil portion cooperate to provide a uniform axial biasing force.

9. The vehicular exterior rearview mirror assembly of claim 1, wherein the first axial biasing force is equal to the second axial biasing force.

10. The vehicular exterior rearview mirror assembly of claim 1, wherein the first axial biasing force is different than the second axial biasing force.

11. A vehicular exterior rearview mirror assembly, the vehicular exterior rearview mirror assembly comprising:
a mirror head comprising a mirror reflective element;
a mounting base configured for attachment at a side of a vehicle;
wherein the mirror head is movable relative to the mounting base between at least an extended position, where the mirror head is extended outward from the side of the vehicle so that the mirror reflective element is positioned to provide a rearward field of view at the side of the vehicle to a driver of the vehicle, and a folded position, where the mirror head is moved inward from the extended position toward the side of the vehicle;

a pivot assembly comprising (i) a pivot post fixed relative to the mounting base, (ii) a housing portion pivotable about the pivot post and (iii) a biasing element disposed at the pivot post between the housing portion and an end of the pivot post, the biasing element urging a detent interface of the pivot assembly into engagement;

wherein, when the mirror head is moved to the extended position or the folded position, the detent interface of the pivot assembly moves into engagement to secure the mirror head in the extended position or in the folded position;

wherein the biasing element comprises a first coil portion and a second coil portion, and wherein the second coil portion is disposed radially inboard of the first coil portion, and wherein the first coil portion is coiled in an opposite direction than the second coil portion;

wherein the pivot assembly comprises a portion of a powerfold actuator that includes an electrically operable motor that, when electrically operated, pivots the mirror head between at least the extended position and the folded position;

wherein the pivot assembly comprises an output gear disposed along and circumscribing the pivot post, and wherein the electrically operable motor rotatably drives a gear that engages the output gear to pivot the mirror head relative to the output gear and the pivot post; and wherein the biasing element is disposed between the housing portion and the output gear to bias the output gear toward the end of the pivot post.

12. A vehicular exterior rearview mirror assembly, the vehicular exterior rearview mirror assembly comprising:
a mirror head comprising a mirror reflective element;
a mounting base configured for attachment at a side of a vehicle;
wherein the mirror head is movable relative to the mounting base between at least an extended position, where the mirror head is extended outward from the side of the vehicle so that the mirror reflective element is positioned to provide a rearward field of view at the side of the vehicle to a driver of the vehicle, and a folded position, where the mirror head is moved inward from the extended position toward the side of the vehicle;
a powerfold actuator that includes an electrically operable motor that, when electrically operated, moves the mirror head between at least the extended position and the folded position;
wherein the powerfold actuator includes a pivot assembly comprising (i) a pivot post fixed relative to the mounting base, (ii) a housing portion pivotable about the pivot post, (iii) a biasing element disposed at the pivot post between the housing portion and an end of the pivot post, the biasing element urging a detent interface of the pivot assembly into engagement, and (iv) an output gear circumscribing the pivot post;
wherein the biasing element is disposed between the housing portion and the output gear to bias the output gear toward the end of the pivot post;
wherein the electrically operable motor, when electrically operated to move the mirror head between the extended position and the folded position, rotatably drives a gear that engages the output gear to pivot the mirror head relative to the output gear and the pivot post;
wherein, when the mirror head is moved to the extended position or the folded position, the detent interface of the pivot assembly moves into engagement to secure the mirror head in the extended position or in the folded position;

wherein the biasing element comprises a first coil portion and a second coil portion, and wherein the second coil portion is disposed radially inboard of the first coil portion, and wherein the first coil portion is coiled in an opposite direction than the second coil portion; and wherein the first coil portion provides a first biasing force at the pivot assembly and the second coil portion provides a second biasing force at the pivot assembly, and wherein the first biasing force is different than the second biasing force.

13. The vehicular exterior rearview mirror assembly of claim 12, wherein the mirror head is manually pivotable relative to the mounting base between the extended position and the folded position.

14. The vehicular exterior rearview mirror assembly of claim 12, wherein the mirror head is manually pivotable relative to the mounting base beyond the extended position to a forward fold position.

\* \* \* \* \*

UNITED STATES PATENT AND TRADEMARK OFFICE
CERTIFICATE OF CORRECTION

PATENT NO. : 12,522,138 B2  
APPLICATION NO. : 18/295308  
DATED : January 13, 2026  
INVENTOR(S) : Johnathan D. Nise et al.

Page 1 of 1

It is certified that error appears in the above-identified patent and that said Letters Patent is hereby corrected as shown below:

In the Specification

Column 2  
Line 40, "11 a" should be --11a--  
Line 44, "11 a" should be --11a--

Column 5  
Lines 46-47, "operable motor 38 when" should be --operable motor 38, when--

In the Claims

Column 6  
Claim 1, Line 65, "(il) a housing portion" should be --(ii) a housing portion--

Column 7  
Claim 11, Line 55, "comprising;" should be --comprising:--

Column 8  
Claim 11, Line 2, "(il) a housing portion" should be --(ii) a housing portion--

Signed and Sealed this  
Tenth Day of February, 2026

John A. Squires  
*Director of the United States Patent and Trademark Office*